April 4, 1944.  G. J. HARMAN ET AL  2,345,669
APPARATUS FOR LOADING AND TRANSPORTING BARRELS
AND DISPENSING LIQUIDS THEREFROM
Filed June 9, 1942  2 Sheets-Sheet 1

GERALD J. HARMAN,
HERBERT C. KLEPPE,
INVENTORS

BY Edwin D. Jones,
ATTORNEY.

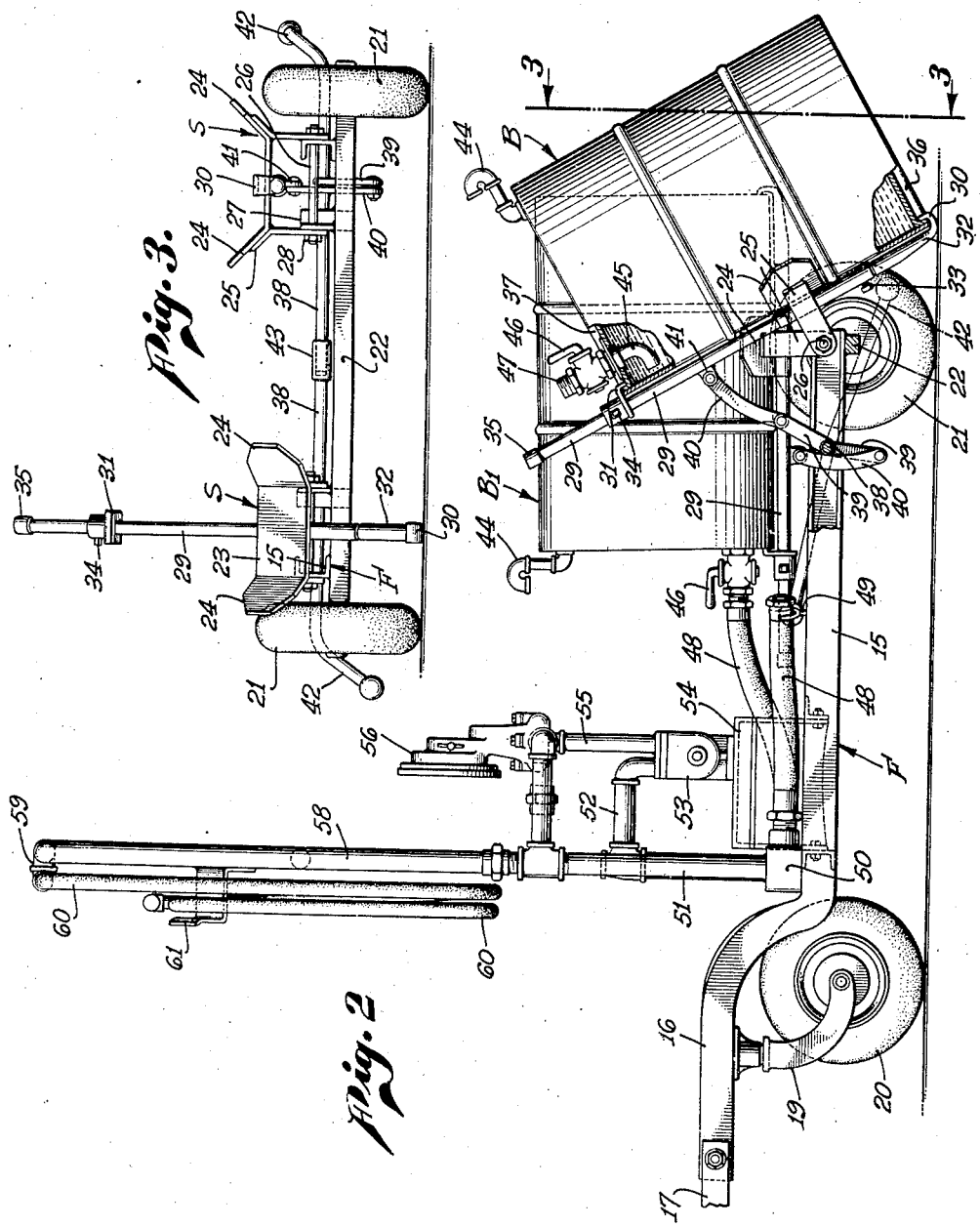

Patented Apr. 4, 1944

2,345,669

UNITED STATES PATENT OFFICE 2,345,669

APPARATUS FOR LOADING AND TRANSPORTING BARRELS AND DISPENSING LIQUIDS THEREFROM

Gerald J. Harman and Herbert C. Kleppe, Los Angeles, Calif.; said Kleppe assignor to said Harman Application June 9, 1942, Serial No. 446,402

19 Claims. (Cl. 214—77)

Our invention relates to and has for a purpose the provision of an apparatus for loading and transporting barrels and dispensing liquids therefrom, and in its present form embodies a wheeled vehicle on which the barrels are adapted to be loaded and then connected to a pump with driving means therefor, and by which the liquid contained in the barrels may be dispensed.

Our invention is particularly designed, although not necessarily, for transporting barrels containing heavy oil to airplanes and then pumping the oil directly from the barrels to the elevated storage tanks of the airplanes.

The apparatus is particularly characterized by one or more barrel loading devices by which a single operator may singly load the filled barrels onto the vehicle with an ease that merely requires a slight tilting of the barrel and the simple operation of a mechanism to lower the barrel into a carrying and oil dispensing position.

Our apparatus in the wheeled vehicle form, is further characterized by means associated with the barrel loading device for holding at least one of the vehicle wheels against rotation to in turn lock the vehicle against movement during the barrel loading operation, so that such operation may be successfully and quickly performed.

A further characterizing feature of our invention is a barrel loading device comprising a support or rack having clamping means for securing the barrel on the support against displacement, and which clamping means is adjustable to position the barrel along the support so that irrespective of the length of the barrel, its outlet may be coupled to a suction base of a fixed length.

We will describe only one form of apparatus for loading and transporting barrels, and dispensing liquids therefrom, embodying our invention, and will then point out the novel features thereof in claims.

In the accompanying drawings:

Fig. 2 is a view partly in elevation and partly in section, and taken on the line 2—2 of Fig. 1.

Fig. 3 is a view taken on the line 3—3 of Fig. 2, but with the pump, pipes, hose rack and hose of Fig. 2 omitted.

Similar reference characters refer to similar parts in each of the several views.

Figure 1:
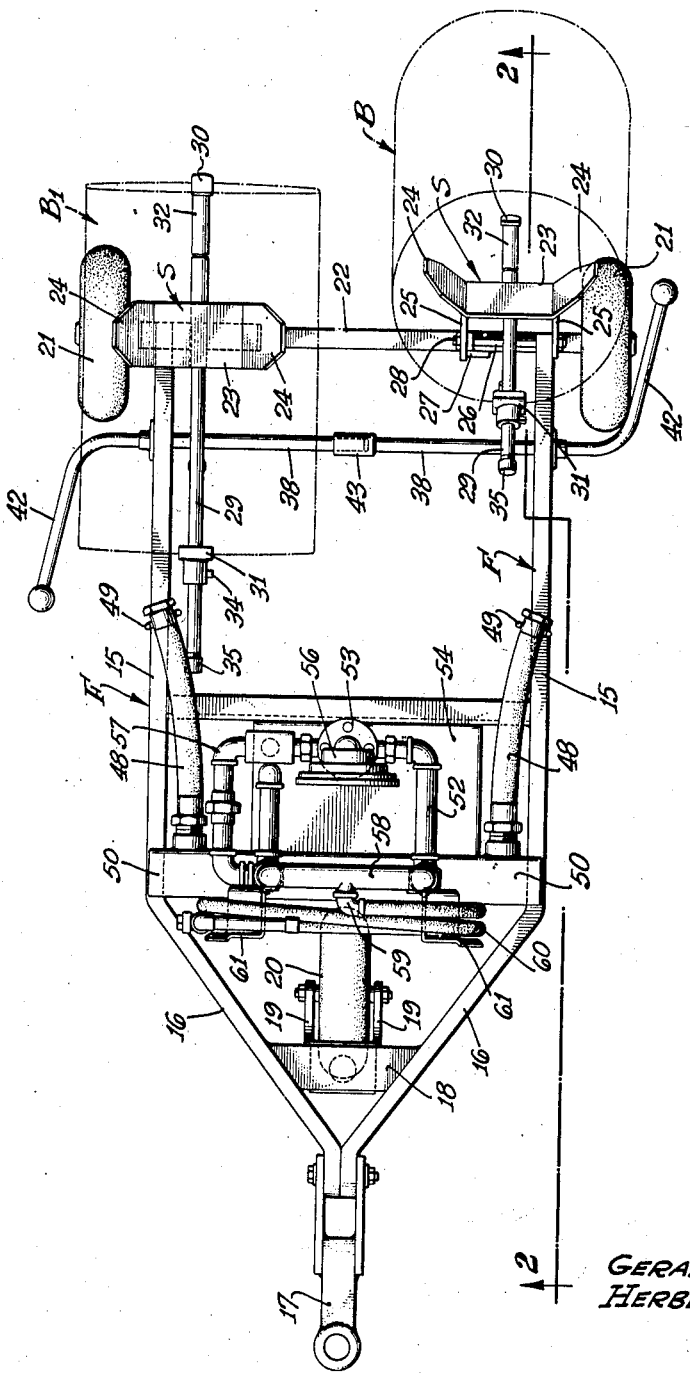
Fig. 1 is a view showing in top plan one form of apparatus for loading and transporting barrels and dispensing liquids therefrom, embodying our invention.

The apparatus in its present embodiment comprises a wheeled vehicle in the form of a trailer to be drawn by a tractor to the oil dispensing point and then disconnected from the tractor so the latter is free for other uses during the oil dispensing operation.

The trailer may comprise a rigid frame F made up of channel side members 15, 15 with converging front end portions 16, 16, on which a hitch or tongue 17 is pivotally mounted for connection to a tractor by which the vehicle as a whole may be moved from place to place. A cross member 18 connects the converging portions 16, and turnably mounted thereon is a fork 19 for a front wheel 20 for supporting the front end of the trailer. The rear end of the trailer is supported by two wheels 21, and all three wheels are preferably provided with pneumatic tires as shown.

The rear wheels 21 are journaled on an axle 22 preferably square, and the axle is welded or otherwise secured to the rear ends of the side members 15.

On the rear end of the trailer frame are mounted two supporting, holding and tilting devices for a pair of metal barrels or drums B and B¹. Each device may comprise a barrel support or rack S in the form of a saddle having a flat center portion 23, and divergent end portions 24, 24, the general contour of the support being angular to seat a barrel against turning movement thereon.

Secured to the divergent portions 24 are a pair of depending ears or trunnions 25 pivoted on rod 26 extending through a bracket 27 secured to the axle 22 and one of the side members 15. Opposite ends of the rod 26 are threaded to receive nuts 28, 28 for retaining the rod against displacement.

The foregoing construction provides a mounting of the barrel support S on the trailer by which it may be swung to a rear extreme position in which it is vertically inclined to permit a barrel to be loaded thereon, and forwardly to a forward extreme position in which it is horizontally inclined to place the barrel in position for carrying by the trailer and the dispensing of oil therefrom.

For securing the barrel on the saddle during and following movements of the support to or from either barrel loading position or barrel carrying and oil dispensing position, adjustable clamping means is provided in association with the saddle. This clamping means may comprise a connecting member 29 in the form of a tubular rod welded or otherwise secured between its ends to the portions 23 of the saddle, and which member or rod carries a pair of adjustable hook-shaped jaws 30 and 31.

The jaw 30 is on the free end of an extension 32 of the rod 29, and which extension telescopes in the rod and may be secured in any desired position of adjustment lengthwise in the rod by a set screw 33. The jaw 31 carries a clutch 34 which normally grips the rod 21 for holding the jaw against movement away from the saddle S, but allows the jaw to be freely moved toward the saddle. The clutch 34 is of the spring pressed lever type, so that by manual operation of the lever the clutch releases the rod to permit movement of the jaw 31 away from the saddle. A collar 35 confines the jaw and clutch on the rod.

The jaws 30 and 31 are designed to engage the top and bottom chimes 36 and 37 of the metal barrels illustrated, and when so positioned operate to fixedly secure the barrel on the saddle. Thus through cooperation of the jaws and saddle the barrel is held against movement or displacement in any direction from the saddle. Adjustment of the jaw 31 permits the clamp to accommodate barrels of different lengths or heights as well as to secure and release a barrel. Adjustment of the jaw 30, however, is only necessary to advance the barrel forwardly in the saddle so that its outlet can be connected to a hose, as will be more fully described hereinafter.

Where the trailer is provided with two pivoted supports and clamping means for a pair of barrels, they are spaced one from the other so that they may be independently operated to load the barrels separately onto the trailer.

To operate each barrel support separate mechanisms are provided, and each comprises a shaft 38, an arm 39 fixed to the shaft, and a curved link 40 pivotally connected to the arm and to an ear 41 fixed to the rod 29. The outer end of the shaft 38 is bent to form a crank 42 which when gripped and turned affords sufficient leverage to turn the shaft in either direction to load a filled barrel and unload an empty barrel.

Also, the crank 42 is of such length and curvature that when in that position in which the saddle S and the rod 29 are vertically inclined to receive a filled barrel, it engages the tire of the adjacent trailer wheel with such security as to lock the wheel against rotation and thereby secure the trailer against rolling movement.

The two shafts 38 of the two mechanisms are alined transversely of the trailer frame (Fig. 1) and journaled at their outer ends in the side members 15, while their inner ends are connected for independent rotation by a sleeve 43 fixed to one shaft end.

Each barrel B or B¹ is provided with a curved air inlet nozzle 44, a liquid outlet nozzle 45 curved to a point inside the barrel to insure dispensing of substantially all liquid when the barrel is in dispensing position. The outlet nozzle 45 carries a hand plug valve 46, and a coupling 47 for connection to one end of a suction hose 48 supported in a rack 49 on the side frame member 15, when not in use.

The other end of the hose 48 is permanently coupled to a suction manifold 50 extending across the trailer frame. This manifold, in turn, is connected through pipe 51 and 52 to a pump 53 which is driven by a suitable motor (not shown) on a platform 54. Rising from the pump is a discharge pipe 55 connected to a meter 56 to a vertical pipe 58 with an outlet nozzle 59 to which a discharge hose 60 is connected and normally supported on a rack 61.

The arrangement of pipes, pump, meter and manifold form no part of the present invention, suffice it to say that the two suction hoses 48 when connected to the outlet nozzles of the barrels, permit the pump to draw liquid from the barrels for discharge from the discharge hose 60.

In the operation of our apparatus, either barrel B or B¹ may be loaded on the trailer, by first moving the respective support S to the rearwardly inclined position. This is accomplished by the operator actuating the respective crank 42 to rotate one shaft 38 in such direction that the arm 31 is moved upwardly thus lifting the link 40 to elevate the rod 29 to the vertically inclined position, whereby the support S is swung to a corresponding position. In this position of the rod 29, the jaw 30 contacts with the ground so that a single operator can by slightly tilting the barrel away from the trailer, cause the bottom chime 36 to seat on the jaw. Once this is accomplished the barrel is tilted forwardly by the operator to the position shown, wherein it rests against the saddle. Now by sliding the jaw 31 downwardly on the rod 29 to engage the upper chime 37 the barrel is firmly secured on the support against displacement in any direction.

Tilting of the barrel onto the support does not move the support or the trailer, for with the previous operation of the crank 42 to move the support to rearwardly tilted position it has been brought into frictional engagement with the adjacent tire, thereby locking the actuating mechanisms and also preventing forward movement of the trailer.

With the barrel secured on the support as described, it may be loaded on the trailer by swinging the crank 42 upwardly and forwardly, which actuates the shaft 38 and its connection with the rod 29 to pull the rod and saddle forwardly and downwardly, thus moving the barrel to substantially horizontal position on the trailer, ready for coupling to the respective suction hose 48. In point of fact, the barrel in its final position is slightly inclined forwardly to insure all liquid being drawn from the barrel by the suction pump. Should the particular barrel be of such length that its plug valve cannot be coupled to the suction hose because the latter is too long or short, a compensating adjustment of the barrel lengthwise on the support, can be effected by an adjustment of the jaw 32 which is made at the time of applying the barrel to the support.

An important feature of the mechanism for moving the barrel to dispensing position is that the trailer wheel is not released until the barrel has passed forwardly of its dead center position in respect to the pivot 26, when further movement of the barrel is ineffective to push the trailer forwardly. Also, in the dispensing position of the barrel on the trailer, the connection between the link 40 and the arm 39 is beyond a dead center position (Fig. 2), so that any tendency of the barrel and its support to move upwardly on the trailer, is restrained by the mechanism.

Once the two barrels are loaded on the trailer and the section lines connected to the barrels, the vehicle is ready for towing to the point of dispensing, when the pump may set into operation to suck the liquid from the barrels and discharge it from the hose 60. Once the barrels are emptied, they can be easily removed from the trailer for replacement by filled barrels, by first operating the cranks 42 to swing the barrel supports to the rearwardly tilted positions, when by disengaging the jaws 31 from the upper chimes, the barrels can be removed from the supports.

We claim:

1. In combination; a wheeled vehicle having a frame; a barrel support having barrel clamping means thereon; means for mounting said support for movement on said frame to occupy a barrel loading position and a barrel carrying position; and mechanism for moving said support to either of said positions and for locking at least one wheel of said vehicle against movement during the barrel loading operation.

2. In combination; a wheeled vehicle having a frame; a barrel support having barrel clamping means thereon; means for mounting said support for pivotal movement on said frame to occupy one position in which a barrel may be loaded on the support by tilting of the barrel, and another position in which the barrel moved into the vehicle frame; and mechanism on said frame for moving said support to either of said positions said mechanism including a member engageable with one of the wheels of said vehicle for locking the vehicle against movement during the barrel loading operation.

3. In combination; a wheeled vehicle having a frame; a barrel support having barrel clamping means thereon; means for mounting said support for pivotal movement on said frame to occupy one position in which a barrel may be loaded on the support by tilting of the barrel, and another position in which the barrel is moved onto the vehicle frame; and mechanism on said frame for moving said support to either of said positions said mechanism including a shaft having a crank arm thereon movable to engage one of the wheels of said vehicle when said support is moved to barrel loading position for locking the vehicle against movement during the barrel loading operation.

4. In combination; a wheeled vehicle having a frame; a barrel support having barrel clamping means thereon; means for mounting said support for pivotal movement on said frame to occupy one position in which a barrel may be loaded on the support by tilting of the barrel, and another position in which the barrel is moved onto the vehicle frame; and mechanism on said frame for moving said support to either of said positions said mechanism including a shaft journaled in said frame, an arm fixed to said shaft, a link connecting said arm with said support, and a crank on said shaft for engaging one of the wheels of said vehicle to lock the vehicle against movement during the barrel loading operation.

5. In combination; a vehicle having a frame, and wheels supporting the frame and provided with tires; a barrel support having barrel clamping means thereon; means for mounting said support for movement on said frame to occupy a barrel loading position and a barrel carrying position; and mechanism for moving said support to either of said positions, and for engaging the tire of one of said wheels to secure the vehicle against movement during the barrel loading operation.

6. In combination; a vehicle having a frame and wheels supporting the frame; two barrel supports having barrel clamping means thereon; means for mounting said supports for independent movements to occupy barrel loading positions and barrel carrying positions; and independent mechanisms for moving said supports to either of said positions, said mechanisms each including means for locking one of the wheels of said vehicle when the respective said support is in barrel loading position.

7. In combination; a vehicle having a frame and wheels supporting the frame; two barrel supports having barrel clamping means thereon; means for mounting said supports for independent movements to occupy barrel loading positions and barrel carrying positions; and independent mechanisms for moving said supports to either of said positions, said mechanisms each including means for locking one of the wheels of said vehicle when the respective said support is in barrel loading position, each of said mechanisms including a shaft journaled in said frame and operatively connected to the respective barrel support, and a crank on said shaft for rotating the latter to operate the mechanism and for locking one of the vehicle wheels against rotation when the respective barrel support is moved to barrel loading position.

8. In combination; a vehicle having a frame and wheels supporting the frame; two barrel supports having barrel clamping means thereon; means for mounting said supports for independent movements to occupy barrel loading positions and barrel carrying positions; and independent mechanisms for moving said supports to either of said positions, said mechanisms each including means for locking one of the wheels of said vehicle when the respective said support is in barrel loading position, said mechanisms comprising alined shafts rotatable in said frame and connected to each other, for independent rotation, arms fixed to said shafts, links operatively connecting said arms to said barrel supports, and operating cranks on said shafts independently engageable with the vehicle wheels for locking the latter against rotation when said supports are in barrel loading position.

9. In combination; a wheeled vehicle; pivoted means for loading barrels onto said vehicle; and means operable by said pivoted means to engage and lock at least one wheel of said vehicle for securing said vehicle against movement during the barrel loading operation.

10. In combination; a vehicle having a frame; two barrel supports having barrel clamping means thereon; means for mounting said supports for independent movements to occupy barrel loading positions and barrel carrying positions; and independent mechanisms for moving said supports to either of said positions, said mechanisms including alined shafts rotatable in said frame and connected to each other at their inner ends for independent rotation, arms fixed to said shafts, links operatively connecting said arms to said barrel supports, and operating cranks on the outer ends of said shafts.

11. In combination; a frame upon which a pump and a hose are adapted to be supported; a support for a barrel with an outlet nozzle adapted for connection to said hose, said support including a member pivoted on said frame to occupy one position in which the barrel may be loaded onto said support, and another position in which the barrel may be carried by said frame and so disposed that its outlet nozzle may be connected to said hose; and means on said member for clamping the barrel to said support, said means being adjustable to secure barrels of different lengths on said member and in such positions thereon that the outlet nozzles thereof may be connected to said hose when said member is in the second mentioned position.

12. In combination; a frame; a barrel support mounted on said frame for movement to occupy a first position in which a barrel may be loaded onto the support, and a second position in which the barrel is tilted to a carrying position on said frame; and barrel clamping means on said support adjustable to secure to the latter barrels of different lengths and in each instance in a predetermined carrying position on said frame.

13. In combination; a frame; a barrel support comprising a saddle pivoted on said frame, a member secured between its ends to said saddle, a barrel clamping jaw extensibly connected to one end of said member, and a second barrel clamping jaw adjustable on said member at the other end of said saddle.

14. In combination; a frame; a barrel support comprising a saddle pivoted on said frame, a rod secured between its ends to said saddle, an extension adjustable lengthwise on one end of said rod and having a jaw thereon, and a second jaw adjustable on said rod at the other side of said saddle and coacting with the first mentioned jaw to secure a barrel on the rod and saddle and at any point along the length of the rod depending upon the lengthwise adjustment of said extension.

15. In combination; a frame; a barrel support comprising a saddle pivoted on said frame, a member secured between its ends to said saddle, a barrel clamping jaw extensibly connected to one end of said member, and a second barrel clamping jaw adjustable on said member at the other side of said saddle; and mechanism for moving said barrel support to or from an inclined position in which a barrel may by slight tilting be placed on the rod and saddle, and to or from another position in which the barrel after being clamped by said jaws may be tilted to a carrying position on said frame.

16. In combination; a vehicle having a frame; two barrel supports having barrel clamping means thereon; means for mounting said supports for independent movements to occupy barrel loading positions and barrel carrying positions; and independent mechanisms for moving said supports to either of said positions, said mechanisms including alined shafts rotatable in said frame and connected to each other at their inner ends for independent rotation, arms fixed to said shafts, links operatively connecting said arms to said barrel supports, and operating cranks on the outer ends of said shafts, engageable with a part of said vehicle for locking the vehicle against movement when said supports are in barrel loading positions.

17. In combination; a wheeled vehicle having a frame; a barrel support having barrel clamping means thereon; means for mounting said support for rocking movement on said frame to occupy a barrel loading position and a barrel carrying position; a mechanism for moving said support to either of said positions and for locking said vehicle against movement simultaneously with movement of said support to barrel loading position, and releasing said vehicle simultaneously with movement of said support to barrel carrying position.

18. In combination; a frame upon which a suction pump with an intake manifold connected thereto, and a hose connected to the intake manifold, are adapted to be supported; a support for a barrel with an outlet nozzle; means for pivotally mounting said support on said frame to occupy one position in which the barrel may be loaded onto said support, and another position in which the barrel may be carried by said frame and so disposed that its outlet nozzle is positioned for coupling to said hose; and means on said support for securing the barrel thereto.

19. In combination; a frame; an intake manifold for a suction pump fixedly supported on said frame, and having a fluid inlet; a support for a barrel with a fluid outlet nozzle; and means for pivotally mounting said support on said frame to occupy one position in which the barrel may be loaded onto said support, and another position in which the barrel may be carried by said frame and said nozzle disposed in position for coupling to said fluid inlet.

HERBERT C. KLEPPE.
GERALD J. HARMAN.